US012789409B2

(12) United States Patent
Somers et al.

(10) Patent No.: US 12,789,409 B2
(45) Date of Patent: Nov. 10, 2026

(54) FLASH LAMP TREATMENT OF CHEMICALLY-BONDED PHOSPHATE CERAMIC PRECURSORS FOR DIRECT ADDITIVE MANUFACTURE OF CERAMIC COMPOSITES

(71) Applicant: Georgia Tech Research Corporation, Atlanta, GA (US)

(72) Inventors: Nicolas Somers, Atlanta, GA (US); Eren Özmen, Atlanta, GA (US); Mark D. Losego, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 9 days.

(21) Appl. No.: 19/054,205

(22) Filed: Feb. 14, 2025

(65) Prior Publication Data

US 2025/0262795 A1 Aug. 21, 2025

Related U.S. Application Data

(60) Provisional application No. 63/553,665, filed on Feb. 15, 2024.

(51) Int. Cl.

| | |
|---|---|
| ***B28B 1/00*** | (2006.01) |
| ***B33Y 10/00*** | (2015.01) |
| ***B33Y 40/10*** | (2020.01) |
| ***B33Y 40/20*** | (2020.01) |
| ***B33Y 70/00*** | (2020.01) |
| ***B33Y 80/00*** | (2015.01) |
| ***C04B 35/10*** | (2006.01) |
| ***C04B 41/00*** | (2006.01) |

(52) U.S. Cl.
CPC .............. *B28B 1/001* (2013.01); *B33Y 10/00* (2014.12); *B33Y 40/10* (2020.01); *B33Y 40/20* (2020.01); *B33Y 70/00* (2014.12); *B33Y 80/00* (2014.12); *C04B 35/10* (2013.01); *C04B 41/0045* (2013.01); *C04B 41/0072* (2013.01); *C04B 2235/3217* (2013.01); *C04B 2235/3241* (2013.01)

(58) Field of Classification Search
CPC ................ B29C 64/165; B29C 67/248; B29C 67/207; B29C 2045/1695; B29C 66/72325; B29C 66/7461; B29C 71/02; B29C 2071/022; B29C 66/0344; B29C 48/267
See application file for complete search history.

(56) References Cited

U.S. PATENT DOCUMENTS

2023/0278283 A1* 9/2023 Anthony ................ B28B 1/001 264/497

* cited by examiner

*Primary Examiner* — Stella K Yi
(74) *Attorney, Agent, or Firm* — TROUTMAN PEPPER LOCKE LLP; Ryan A. Schneider; Emily M. Tarsis

(57) ABSTRACT

An exemplary embodiment of the present disclosure provides method for manufacturing a ceramic object. The method comprises providing a ceramic material, providing a binding material, and flash lamp annealing the ceramic material and the binding material to induce a chemical reaction between the ceramic material and the binding material. Another exemplary embodiment of the present disclosure provides a system for manufacturing a ceramic product. The system comprises a ceramic material, a binding material, and a lamp for flash lamp annealing, wherein the lamp is configured to generate light to induce a chemical reaction between the ceramic material and the binding material to create the ceramic product.

15 Claims, 11 Drawing Sheets

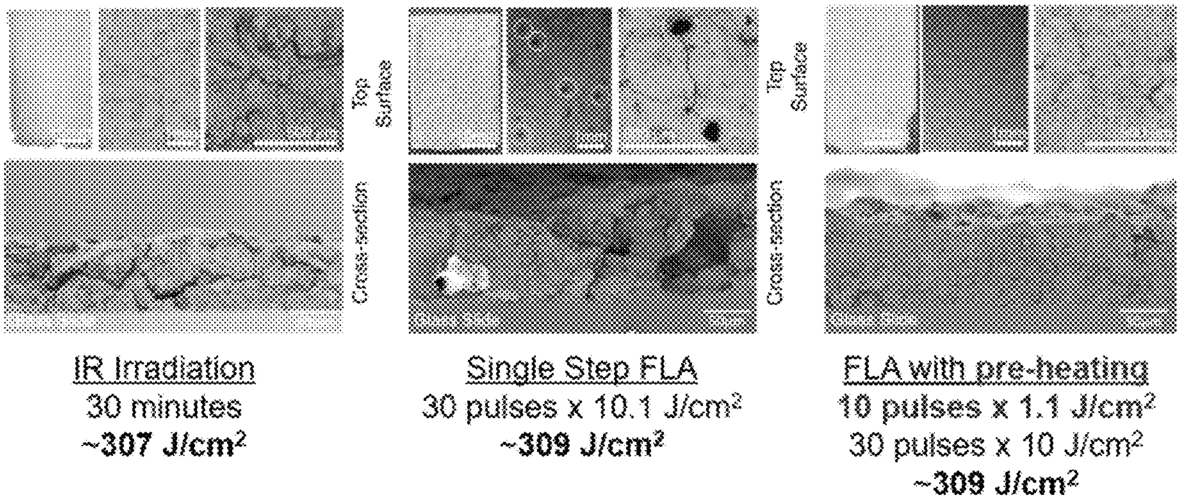
FIG. 10
FIG. 11A
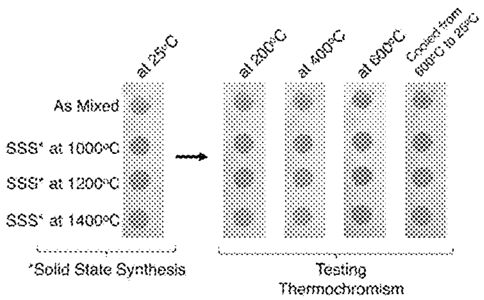
FIG. 11B
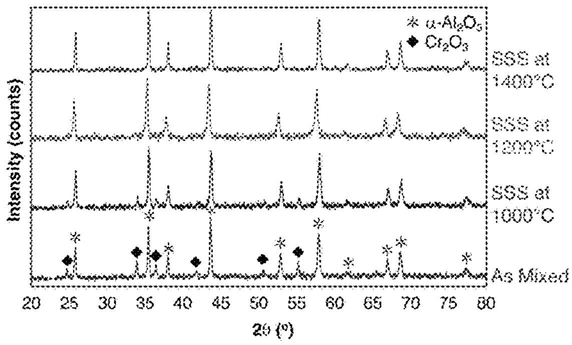

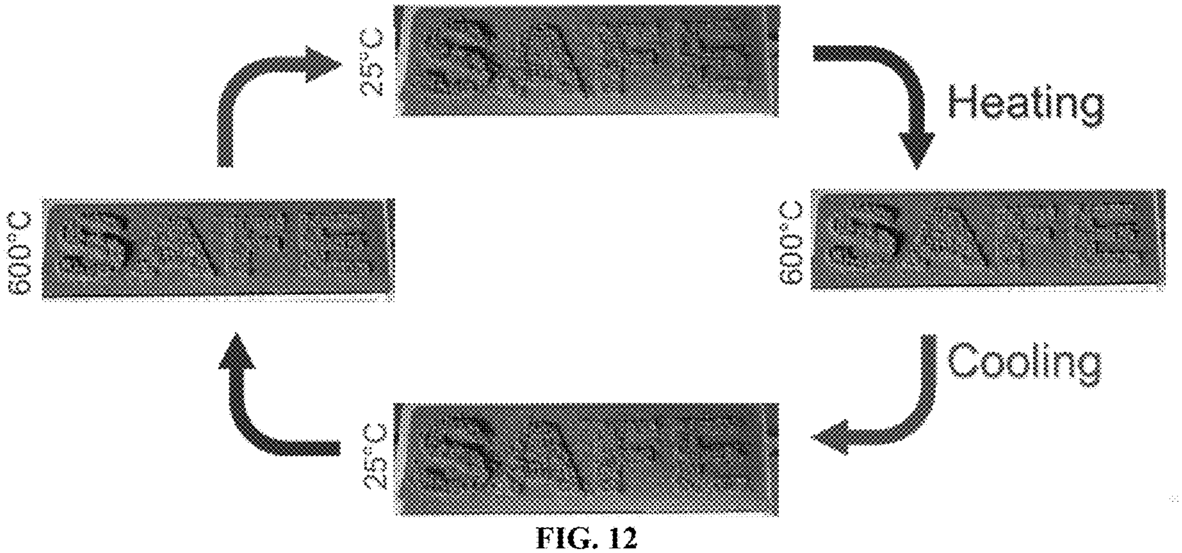
FIG. 12
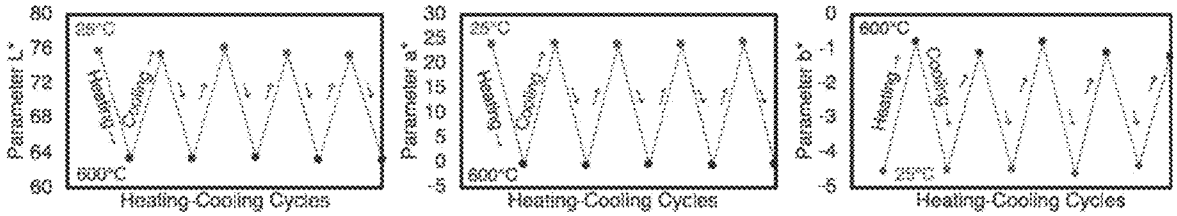
FIG. 13
FIG. 14A
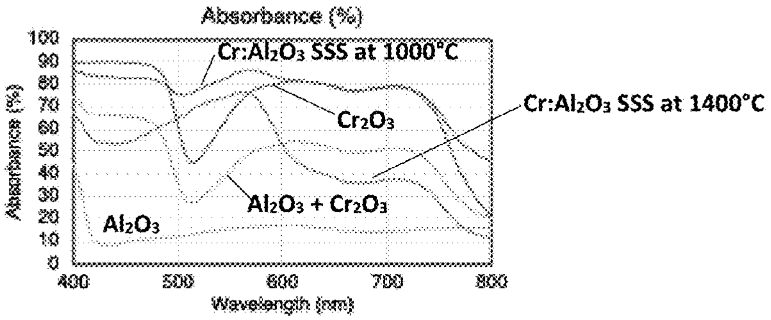
FIG. 14B
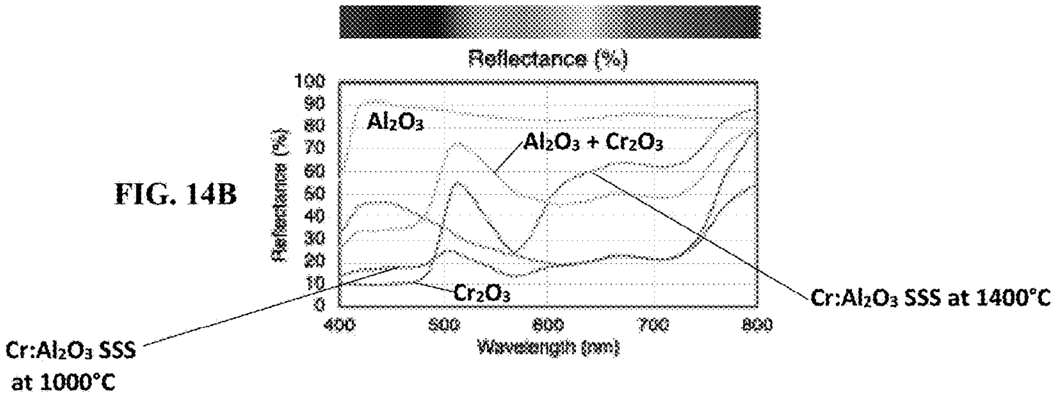

FIG. 15B
FIG. 15C
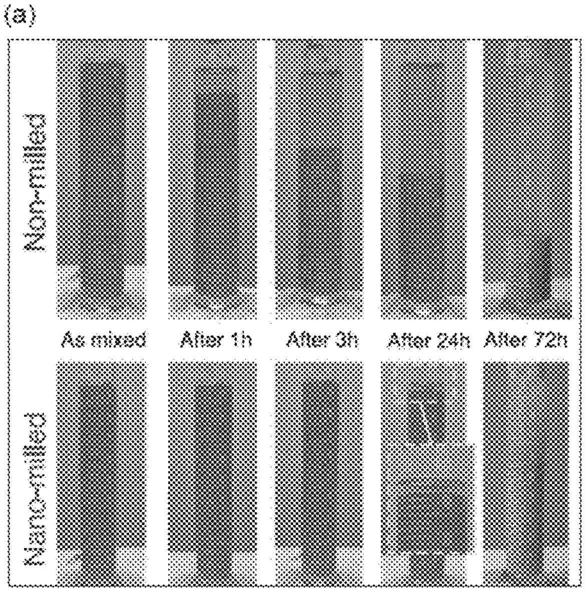
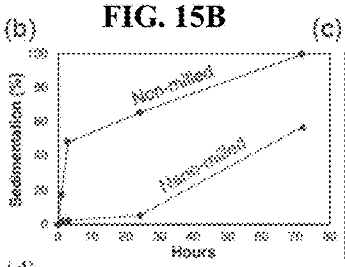
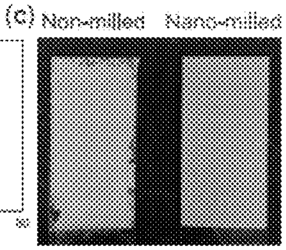
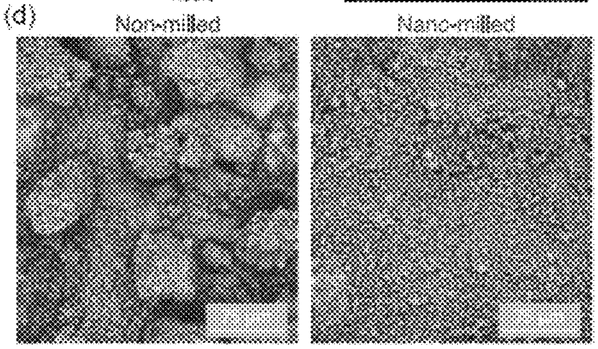
FIG. 15A
FIG. 15D

FLASH LAMP TREATMENT OF CHEMICALLY-BONDED PHOSPHATE CERAMIC PRECURSORS FOR DIRECT ADDITIVE MANUFACTURE OF CERAMIC COMPOSITES

CROSS-REFERENCE TO RELATED APPLICATIONS

This application claims the benefit of U.S. Provisional Application Ser. No. 63/553,665, filed on Feb. 15, 2024, which is incorporated herein by reference in its entirety as if fully set forth below.

STATEMENT REGARDING FEDERALLY SPONSORED RESEARCH OR DEVELOPMENT

This invention was made with government support under N00014-23-1-2076 awarded by the Office of Naval Research. The government has certain rights in the invention.

FIELD OF THE DISCLOSURE

The various embodiments of the present disclosure relate generally to ceramic manufacturing, and more particularly to additive manufacturing of ceramic objects.

BACKGROUND

Sintered ceramics and hydraulic cements are two common classes of engineered ceramics. Sintered ceramics are synthesized by fusion of compacted powders, which generally requires high-energy manufacturing processes, including high temperatures (1500° C. to 3000° C.) and/or pressures. Upon sintering, these ceramics fuse particles together by forming primary chemical bonds (covalent/ionic), giving them desired properties such as high wear resistance, high chemical stability, corrosion resistance, and high hardness. In contrast, hydraulic cements can be formed using low-energy processes in which the inorganic precursors react with water under ambient conditions to form hydrogen bonded inorganic compounds. While hydraulic cements exhibit good mechanical properties and chemical inertness, their engineering performance usually underperforms sintered ceramics because they maintain much of their cohesion through weaker van der Waals forces.

There are numerous processing methods and strategies to bind ceramics. These methods include microwave sintering, spark plasma sintering, conventional sintering, selective laser sintering, and vat photopolymerization. Conventional sintering is not energy efficient and involves long sintering time periods. Microwave sintering has a low penetration depth and is subject to material limitations. Spark plasma sintering systems are very expensive and less suitable for three-dimensional sintering. Selective laser sintering utilizes a single wavelength laser, and the manufactured material can be subject to localized thermal tensions. Many of these methods require long application times and are limited in the size of the area of material that they can process.

Additionally, direct additive manufacturing (AM) of ceramics is difficult because it typically requires high temperatures to make fully dense ceramic components. Additive manufactured ceramics are often made by additive manufacturing of a "green body" that needs subsequent annealing in a furnace to debind and sinter into a final ceramic. One of the only current approaches to direct additive manufacturing of ceramics is laser sintering of powders, which involves using a laser to sinter powders together. This does not always achieve the highest resolution and is rather expensive, complicated, and somewhat slowed by the fact that to achieve sintering of powders requires long laser exposure times, so the laser must be rastered very slowly. Selective laser sintering of ceramic powders can be approximately ten times or more slower than similar processes employed for metal additive manufacturing.

Thus, there is a need for faster, cheaper, less energy intensive, and larger area direct ceramic manufacturing methods, particularly those that can be employed in additive manufacturing applications.

The present disclosure is directed to overcoming these and other deficiencies in the art.

BRIEF SUMMARY

An exemplary embodiment of the present disclosure provides method for manufacturing a ceramic object. The method comprises providing a ceramic material, providing a binding material, and flash lamp annealing the ceramic material and the binding material to induce a chemical reaction between the ceramic material and the binding material.

In any of the embodiments disclosed herein, the flash lamp annealing comprises applying light energy at pulses of between approximately 10 microseconds and 10 milliseconds.

In any of the embodiments disclosed herein, the flash lamp annealing can comprise at least one of applying light energy at an energy density of approximately 1 to 1000 $J/cm^2$ and applying light energy at a power of approximately 1 to 50 $kW/cm^2$.

In any of the embodiments disclosed herein, providing the ceramic material and providing the binding material can comprise creating a slurry.

In any of the embodiments disclosed herein, providing the ceramic material and providing the binding material can comprise mixing the ceramic material and the binding material in a slurry, and providing the slurry on a surface for exposure to flash lamp annealing.

In any of the embodiments disclosed herein, mixing the ceramic material and the binding material in the slurry can comprise milling the ceramic material and the binding material, and adding a solvent.

In any of the embodiments disclosed herein, flash lamp annealing the ceramic material and the binding material can comprise sequentially exposing a layer of the slurry on the surface to flash lamp annealing according to a respective three-dimensional-object-patterned slice to create a three-dimensional object comprising slices formed from a cured slurry.

In any of the embodiments disclosed herein, flash lamp annealing the ceramic material and the binding material can comprise applying approximately 1 to 500 pulses of light energy at an energy density of approximately 0.5 to 50 $J/cm^2$.

In any of the embodiments disclosed herein, flash lamp annealing the ceramic material and the binding material can further comprise pre-heating the layer of slurry with approximately 1 to 50 pulses of light energy at an energy density of approximately 0.5 to 5.0 $J/cm^2$ prior to applying approximately 1 to 500 pulses of light energy at an energy density of approximately 0.5 to 50 $J/cm^2$.

In any of the embodiments disclosed herein, the ceramic material can comprise one or more metal oxides selected from the group consisting of alumina, silica, magnesium oxide, zinc oxide, chromium oxide, iron oxide, titanium oxide, calcium oxide, niobium oxide, hafnium oxide, yttrium oxide, zirconium oxide, barium oxide, strontium oxide, and mixtures thereof.

In any of the embodiments disclosed herein, the ceramic material can further comprise an additive configured to induce a material property in the ceramic object.

In any of the embodiments disclosed herein, the additive can comprise an optically active dopant selected from the group consisting of $Cr_2O_3$, $VO_2$, $TiO_2$, ZnO, iron oxide, one or more organic dyes, and carbon (graphite), and the material property comprises thermochromism.

In any of the embodiments disclosed herein, the binding material can comprise a composition configured to create a chemically bonded ceramic (CBC).

In any of the embodiments disclosed herein, the binding material can comprise a composition configured to create a porcelain ceramic.

In any of the embodiments disclosed herein, the binding material can comprise an inorganic binder selected from the group consisting of aluminum dihydrogen phosphate (ADP), aluminum silicate, beryllium phosphate, calcium phosphate, iron phosphate, lanthanum phosphate, magnesium phosphate, sodium phosphate, potassium phosphate, yttrium phosphate, zinc phosphate, zirconium phosphate, alumina silicate, feldspars, magnesium silicate and combinations thereof.

Another exemplary embodiment of the present disclosure provides a system for manufacturing a ceramic product. The system comprises a ceramic material, a binding material, and a lamp for flash lamp annealing, wherein the lamp is configured to generate light to induce a chemical reaction between the ceramic material and the binding material to create the ceramic product.

In any of the embodiments disclosed herein, the lamp can be configured to apply light at pulses of between approximately 10 microseconds and 10 milliseconds.

In any of the embodiments disclosed herein, the lamp can be configured to apply light at an energy density of approximately 1 to 1000 $J/cm^2$.

In any of the embodiments disclosed herein, the lamp can be configured to apply approximately 1 to 500 pulses of light at an energy density of approximately 0.5-50 $J/cm^2$.

In any of the embodiments disclosed herein, the lamp can be configured to pre-heat a slurry of the ceramic material and the binding material with approximately 1 to 50 pulses of light at an energy density of approximately 0.5 to 5.0 $J/cm^2$ prior to applying approximately 1 to 500 pulses of light at an energy density of approximately 1 to 1000 $J/cm^2$.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 10 provides comparison images between ceramics formed from varying processes, in accordance with an exemplary embodiment of the present invention.

FIG. 11A provides photographic images of 10 wt. % Cr-doped $Al_2O_3$ powders SSS at 1000° C., 1200° C. and 1400° C. (left), with corresponding images of these SSS powders subsequently heated to 200° C., 400° C. and 600° C. and then back to room temperature to demonstrate thermochromic response, in accordance with an exemplary embodiment of the present invention. FIG. 11B provides X-ray diffractograms for 10 wt. % Cr-doped $Al_2O_3$ powder mixtures SSS at 1000° C., 1200° C. and 1400° C., with peaks for a-$Al_2O_3$ and $Cr_2O_3$ labelled, in accordance with an exemplary embodiment of the present invention.

FIG. 12 provides images showing a heating and cooling cycle of a thermochromic sensor, in accordance with an exemplary embodiment of the present invention.

FIG. 13 provides data showing a heating and cooling cycle of a thermochromic sensor, in accordance with an exemplary embodiment of the present invention.

FIGS. 14A-14B provide absorbance (FIG. 14A) and reflectance (FIG. 14B) of pure $Al_2O_3$, pure $Cr_2O_3$, $Cr_2O_3$+$Al_2O_3$ physical mixture, Cr:$Al_2O_3$SSS at 1000° C. and $Cr:Al_2O_3$SSS at 1400° C. pellets between 400-800 nm wavelengths, in accordance with an exemplary embodiment of the present invention.

FIG. 15A provides images of non-milled and nano-milled 10 wt % $Cr:Al_2O_3$-ADP slurries in graded cylinders, after their preparation, and 1, 3, 24, and 72 h after, in accordance with an exemplary embodiment of the present invention. FIG. 15B provides a comparison of sedimentation rates of nano-milled (▲) and non-milled (•) slurries overtime, in accordance with an exemplary embodiment of the present invention. FIG. 15C provides photographic images of spray-cast nano-milled and non-milled slurries on glass substrates, in accordance with an exemplary embodiment of the present invention. FIG. 15D provides SEM images of non-milled $Cr:Al_2O_3$ powder and nano-milled $Cr:Al_2O_3$ dried from slurries on glass slides, in accordance with an exemplary embodiment of the present invention.

DETAILED DESCRIPTION

Figure 1:
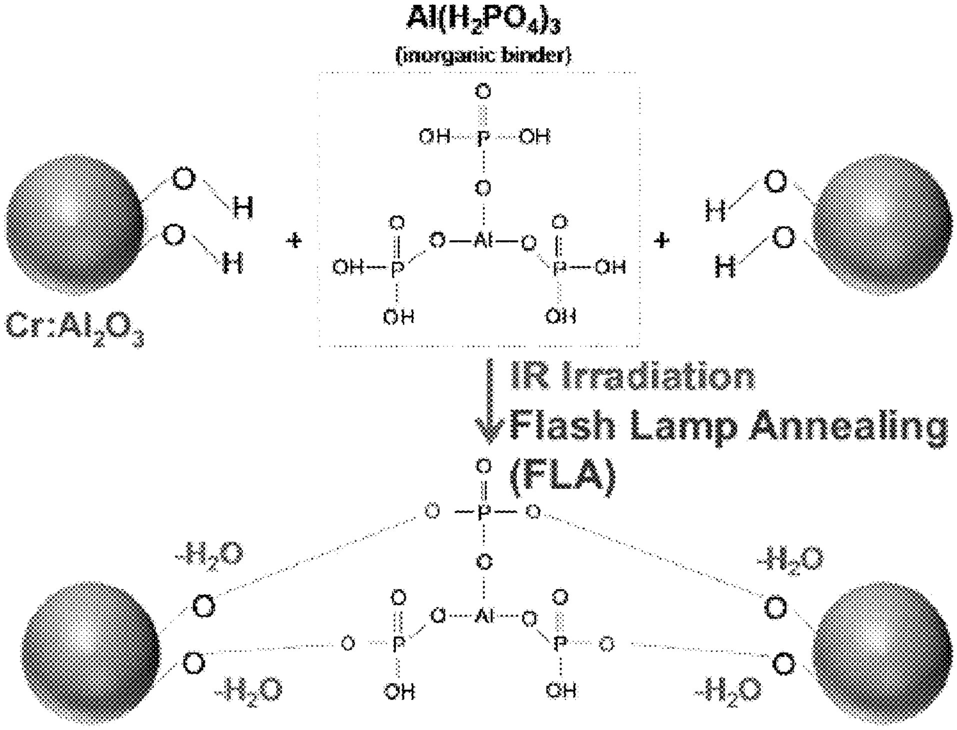
FIG. 1 provides an example ceramic forming reaction process, in accordance with an exemplary embodiment of the present invention.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, member, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The materials described as making up the various members of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Chemically bonded ceramics (CBCs) are an attractive alternative that exists between sintered ceramics and hydraulic cements. CBCs use inorganic binders that can be thermally transformed into primary-bonded ceramic phases at relatively low temperatures (<500° C.), providing a compromise between the higher performance of sintered ceramics and the lower process temperatures of hydraulic cements.

Chemically bonded phosphate ceramics (CBPCs) are composites that can be obtained by dissolving an inorganic phosphate binder along with a dense ceramic powder in a solvent, and subsequently reassembling the dissolved components into a new solid structure (Wagh, "Introduction to Chemically Bonded Ceramics," in Wagh, ed., *Chemically Bonded Phosphate Ceramics,* $2^{nd}$ Ed., Cambridge, MA: Elsevier, pp. 1-16 (2016); Wagh, "Recent Progress in Chemically Bonded Phosphate Ceramics," *ISRN Ceramics* 2013:1-20 (2013)). This acid-base type CBPC synthesis reaction usually takes place between an anion donor phosphate binder such as phosphoric acid ($H_3PO_4$), diammonium hydrogen phosphate $(NH_4)_2HPO_4$, or aluminum dihydrogen phosphate ($Al(H_2PO_4)_3$, ADP), and a metal oxide like magnesium oxide (MgO) or alumina ($Al_2O_3$) (Wagh et al., "Chemically Bonded Phosphate Ceramics: I, A Dissolution Model of Formation," *Journal of the American Ceramic Society* 86(11):1838-1844 (2003)). These systems undergo condensation polymerization reactions that form ceramic phosphate phases bound together by $PO_4$ tetrahedra linkages. The formation of CBPCs requires low temperatures (<500° C.). Thus, CBPCs have lower energy requirements than sintered ceramics while retaining high chemical resistance, high compressive strength, high abrasion resistance, biocompatibility, and good dimensional and thermal stability, often above 1000° C. (Zezulova et al., "Mechanical Properties of Chemically Bonded Phosphate Ceramics with Incorporation of Barium Ions," *J. Phys.: Conf. Ser.* 2341(1): 012005 (2022)). Additionally, CBPCs' versatile chemistry allows functionality to be added to the final product, including corrosion resistance by doping with molybdate or chromate (Liu et al., "The Influence of Curing Agents on Thermal Property and Corrosion Resistance of Chemically Bonded Phosphate Ceramic Coatings," *J Sol-Gel Sci Technol* 89(2):403-415 (2019)), self-healing capability by doping with cerium oxide (Rebillat, "Advances in Self-Healing Ceramic Matrix Composites," in Low, ed., *Advances in Ceramic Matrix Composites*, Cambridge, MA: Elsevier, pp. 475-514 (2014)), semi-conductivity by doping with indium and its oxides, and thermochromism by doping with vanadium or chromium oxides (Pérez and Guerrero, "Thermochromic Cement Based Materials," in Liew, eds., *Smart Nanoconcretes and Cement-Based Materials*, Cambridge, MA: Elsevier, pp. 403-418 (2020)).

Among these properties, thermochromism stands out for its significant role in monitoring the temperature of engine components in aviation, aerospace, and automotive applications (White and LeBlanc, "Thermochromism in Commercial Products," *J. Chem. Educ.* 76(9):1201 (1999); Karpagam et al., "Development of Smart Clothing for Military Applications Using Thermochromic Colorants," *The Journal of The Textile Institute* 108(7):1122-1127 (2016); Wu et al., "Applications of Thermochromic and Electrochromic Smart Windows: Materials to Buildings," *Cell Reports Physical Science* 4(5):101370 (2023)). Additionally, thermochromic sensors can serve as security sensors to ensure that components operate within their optimal temperature range (Hakami et al., "Review on Thermochromic Materials: Development, Characterization, and Applications," *J Coat Technol Res* 19(2):377-402 (2022)). Inorganic oxides, such as $VO_2$, $Cr_2O_3$, $TiO_2$ and ZnO are commonly used as optically-active dopants to achieve thermochromism in ceramics (Zhang et al., "Thermochromic and Infrared Emissivity Characteristics of Cobalt Doped Zinc Oxide for Smart Stealth in Visible-Infrared Region," *Optical Materials* 86:464-470 (2018); Liu et al., "Reversible Thermochromic Property of Cr, Mn, Fe, Co-Doped $Ca_{14}Zn_6Ga_{10}O_{35}$," *J. Mater. Chem. C* 8(28):9615-9624 (2020); Ferro et al., "Thermochromic Properties of Some Colored Oxide Materials," *Optical Materials: X* 15:100167 (2022)). For example, $VO_2$ is used to obtain thermochromic smart windows by the replacement of $V^{4+}$ with a small amount of penta- or hexavalent ions (Huang et al., "Preparation of VxW1−xO2 (M)@SiO2 Ultrathin Nanostructures with High Optical Performance and Optimization for Smart Windows by Etching, *J. Mater. Chem. A* 1(40):12545 (2013); Gao et al., "Phase and Shape Controlled VO2 Nanostructures by Antimony Doping," *Energy Environ. Sci.* 5(9):8708 (2012)). However, the low thermochromic transition temperature ($T_c$) of $VO_2$ ($T_c$=68° C.) limits its use in high temperature (>200° C.) sensing applications such as engines and furnaces. The thermochromic color change in Mg—Ni—H thin films has been studied as an alternative to low transition temperature materials (Raskovid-Lovre et al., "Thermochromic and Photochromic Colour Change in Mg—Ni—H Thin Films," *Materials Letters* 188:403-405 (2017)). A yellow to red color change of these thin films can be observed up to 200° C. For higher-temperature applications, chromium doping of oxide ceramics is an attractive candidate. For instance, Cr-doped $Al_2O_3$ can be obtained by replacing $Al^{+3}$ ions with $Cr^{+3}$ ions using solid state synthesis (SSS). The thermochromism mechanism in chromium-doped alumina derives from ligand-field theory, crystal lattice dynamics, and electronic transitions (Nguyen et al., "Synthesis of Cr-Doped Al2O3 by Pechini Sol-Gel Method and Its Application for Reversible Thermochromic Sensors," *Materials Chemistry and Physics* 223:708-714 (2019); Sone and Fukuda, *Inorganic Thermochromism*; Jørgensen, C. K., Lappert, M. F., Lippard, S. J., Margrave, J. L., Niedenzu, K., Nöth, H., Parry, R. W., Yamatera, H., Series Eds.; Inorganic Chemistry Concepts; Vol. 10; Springer Berlin Heidelberg: Berlin, Heidelberg (1987)). Ligand field effects force $Cr^{3+}$ ions into constrained octahedral cages formed by $O^{2-}$ ions at lower temperatures, leading to a specific electronic configuration and the existence of a red color due to d-orbitals splitting. At higher temperatures, the lattice expands and the $Cr^{3+}$ ions' environment changes to alter its electronic configuration. The competition between $Cr^{3+}$ and $Al^{3+}$ ions for appropriately sized cages, and the temperature-induced expansion, triggers a shift in color from red to green. Thus, color changes from red to pink to green between 20° and 900° C. are possible and depend upon chromium concentration.

Disclosed herein are methods for making CBPC ceramic composites from thermochromic $Cr_2O_3$-doped $Al_2O_3$(Cr:$Al_2O_3$) powders using a photonic sintering process in a first attempt to demonstrate how this processing method could be used to additively manufacture functional ceramic components. Inventors have previously demonstrated that infrared (IR) light can be used to synthesize and bind CBPC composites (Somers et al., "Infrared Irradiation to Drive Phosphate Condensation as a Route to Direct Additive Manufacturing of Oxide Ceramics," *J Am Ceram Soc.* 107(1):36-46 (2024)). Herein, an even more rapid photonic processing method is introduced, flash lamp annealing (FLA), to activate the chemical reactions in these CBPC composites. FLA can utilize a capacitor bank to drive a broadband xenon flash lamp to emit ultrashort pulses (0.1-10 ms) of radiation to rapidly heat surfaces. This method has mainly been used for annealing thin films, sintering metal lines on temperature-sensitive substrates, reflowing solder, activating dopants, and improving the crystallinity of semiconductors (McMahon et al., "Flash-Lamp Annealing of Semiconductor Materials—Applications and Process Models," *Vacuum* 81(10): 1301-1305 (2007); Prucnal et al., "Solar Cell Emitters Fabricated by Flash Lamp Millisecond Annealing," *Acta*

*Phys. Pol. A* 120(1):30-34 (2011); Endo et al., "Thin-Film Polycrystalline Silicon Solar Cells Formed by Flash Lamp Annealing of a-Si Films," *Thin Solid Films* 518(17):5003-5006 (2010); Malllikarjuna et al., "Photonic Drying/Annealing: Effect of Oven/Visible Light/Infrared Light/Flash-Lamp Drying Annealing on $WO_3$ for Electrochromic Smart Windows," *ACS Sustainable Chem. Eng.* 9(43):14559-14568 (2021)). With the development of more powerful FLA tools, a limited number of oxide ceramic sintering processes have been reported (Gilshtein et al., "Millisecond Photonic Sintering of Iron Oxide Doped Alumina Ceramic Coatings," *Sci Rep* 11(1):3536 (2021); O'Connor et al., "Stabilization of Ferroelectric HfxZr1−xO2 Films Using a Millisecond Flash Lamp Annealing Technique," *APL Materials,* 6(12):121103 (2018); Park et al., "Rapid, Cool Sintering of Wet Processed Yttria-Stabilized Zirconia Ceramic Electrolyte Thin Films," *Sci Rep* 7(1):12458 (2017); Shin et al., "Fabrication of Scandia-Stabilized Zirconia Thin Films by Instant Flash Light Irradiation," *Coatings* 10(1):9 (2019); Attallah et al., "Millisecond Flash Lamp Curing for Porosity Generation in Thin Films," *Sci Rep* 13(1):7765 (2023); Elsayed et al., "Glass Powders and Reactive Silicone Binder: Application to Digital Light Processing of Bioactive Glass-Ceramic Scaffolds," *Ceramics International* 46(16):25299-25305 (2020)). As disclosed herein, combining the lower thermal budget requirements of CBPC synthesis with this advanced and rapid heating technique can form new processing pathways for manufacturing functional ceramic components of arbitrary shapes and designs.

This approach to manufacturing ceramics has the potential to be faster, cheaper, and less energy intensive. The use of a CBPC chemistry reduces the energy intensity, because ceramic formation does not rely on sintering but rather chemical reaction. In addition, the FLA process is capable of irradiating large areas (tens of square centimeters to meters squared) in a single pulse, so rather than slow rastering, large sections could rapidly be converted.

As used herein, the term "direct additive manufacturing (AM)" describes a process in which the final AM product is a ceramic and not a green-body that needs to be subsequently annealed in a furnace to debind and sinter into a final ceramic.

An exemplary embodiment of the present disclosure provides a method for manufacturing a ceramic object. The method comprises providing a ceramic material, providing a binding material, and flash lamp annealing the ceramic material and the binding material to induce a chemical reaction between the ceramic material and the binding material.

FIG. 1 shows an example ceramic forming reaction process. This process enables direct additive manufacturing of ceramic composites. The chemistry can be directly printed in various forms (slurry, paste, etc.) and then flash lamp annealed into a ceramic. This can be repeated to build a three-dimensional object. The formed chemically bonded phosphate ceramic phases (CBPCs) have thermal stability up to and in some cases exceeding 1400° C., making them useful for a variety of high temperature applications. The composite structure can be formed by mixing other ceramic powders with the CBPC. These ceramic powder additions can provide additional functionality to the composite. In some embodiments, a thermochromic ceramic material that changes color at different temperatures is added, so it can be used as a temperature sensor. Printing into different shapes could also enable meta properties, including non-linear mechanical or optical properties.

Figure 2:
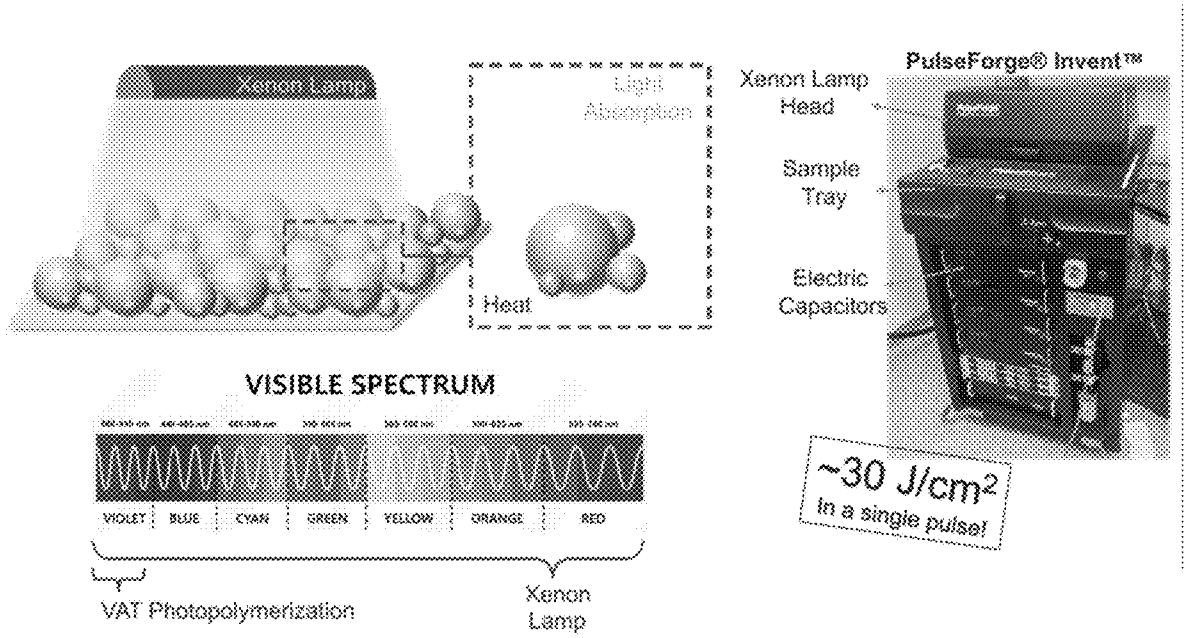
FIG. 2 provides a schematic for a ceramic forming process, in accordance with an exemplary embodiment of the present invention.

FIG. 2 shows a schematic of a method for forming a ceramic. A xenon lamp used in this example flash lamp annealing process uses light in pulses of about 30 J/cm$^2$. In some embodiments the xenon lamp provides visible light, infrared (IR) light, ultra-violet (UV) light, or combinations thereof.

In any of the embodiments disclosed herein, the flash lamp annealing can comprise applying light energy at an energy density of approximately 1 to 1000 J/cm$^2$. For example, in some embodiments, the flash lamp annealing comprises applying light energy at an energy density of approximately 1 to 200 J/cm$^2$, 1 to 400 J/cm$^2$, 1 to 600 J/cm$^2$, 1 to 800 J/cm$^2$, 100 to 200 J/cm$^2$, 1 to 200 J/cm$^2$, 100 to 400 J/cm$^2$, 100 to 600 J/cm$^2$, 100 to 800 J/cm$^2$, 100 to 1000 J/cm$^2$, 200 to 400 J/cm$^2$, 200 to 600 J/cm$^2$, 200 to 800 J/cm$^2$, 200 to 1000 J/cm$^2$, 400 to 600 J/cm$^2$, 400 to 800 J/cm$^2$, 400 to 1000 J/cm$^2$, 600 to 800 J/cm$^2$, 600 to 1000 J/cm$^2$, or 800 to 1000 J/cm$^2$.

In any of the embodiments disclosed herein, the flash lamp annealing can comprise applying light energy at a power of approximately 1 to 50 kW/cm$^2$. For example, in some embodiments, the flash lamp annealing comprises applying light energy at a power of approximately 1 to 10 kW/cm$^2$, 1 to 20 kW/cm$^2$, 1 to 30 kW/cm$^2$, 1 to 40 kW/cm$^2$, 10 to 20 kW/cm$^2$, 10 to 30 kW/cm$^2$, 10 to 40 kW/cm$^2$, 10 to 50 kW/cm$^2$, 20 to 30 kW/cm$^2$, 20 to 40 kW/cm$^2$, 20 to 50 kW/cm$^2$, 30 to 40 kW/cm$^2$, 30 to 50 kW/cm$^2$, or 40 to 50 kW/cm$^2$.

In any of the embodiments disclosed herein, the ceramic material and the binding material can be mixed to form a slurry, which can be provided on a surface for exposure to flash lamp annealing. In some embodiments, the slurry can be formed by dissolving the binding material in a solvent and mixing the resulting solution with the ceramic material. Suitable solvents include water, alcohols, and mixtures thereof. In some embodiments the slurry can be milled in a high energy ball mill. In some embodiments, the final ratio of the binding material to the ceramic material ranges from 1:99 to 75:25 by volume. In some embodiments, the molar ratio of binding material to ceramic material ranges from 1:1 to 1:100. In certain embodiments, the molar ratio of binding material to ceramic material ranges from 1:5 to 1:12, 1:5 to 1:13, 1:5 to 1:14, 1:6 to 1:12, 1:6 to 1:13, or 1:6 to 1:14.

In any of the embodiments disclosed herein, mixing the ceramic material and the binding material in the slurry can also comprise adding an IR, optical, or UV light absorber to improve the photothermal conversion of energy (converting light energy to thermal energy) and more efficiently drive the chemical reactions desired in these slurries to form the ceramics. Suitable additives include, without limitation, $Cr_2O_3$, $VO_2$, $TiO_2$, ZnO, iron oxide, one or more organic dyes, or carbon (graphite) or combinations thereof.

Figure 3:
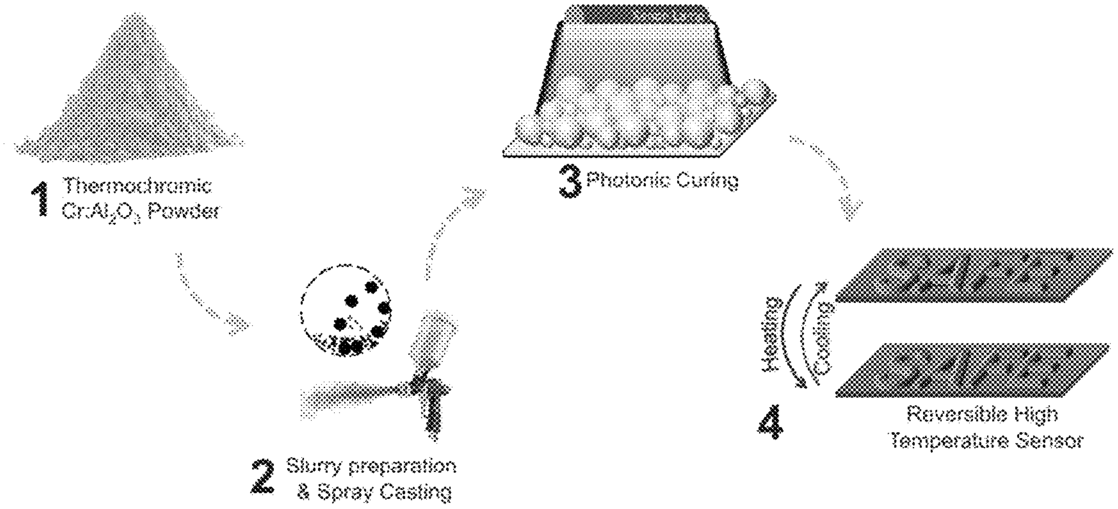
FIG. 3 provides schematic workflow for an example high temperature ceramic sensor, in accordance with an exemplary embodiment of the present invention.
Figure 4:
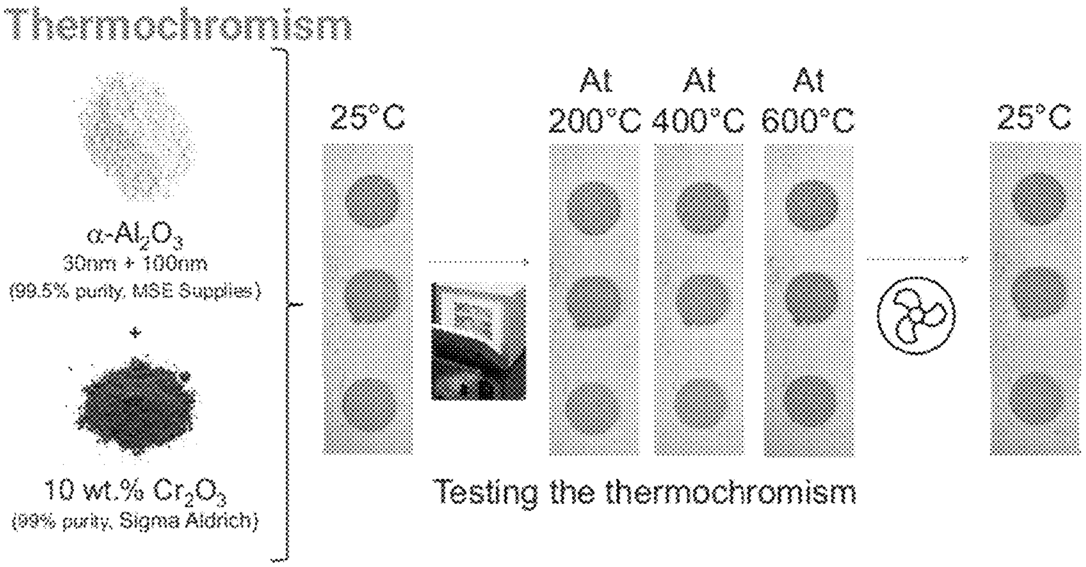
FIG. 4 provides images of a ceramic material and thermochromic ceramic objects, in accordance with an exemplary embodiment of the present invention.
Figure 5:
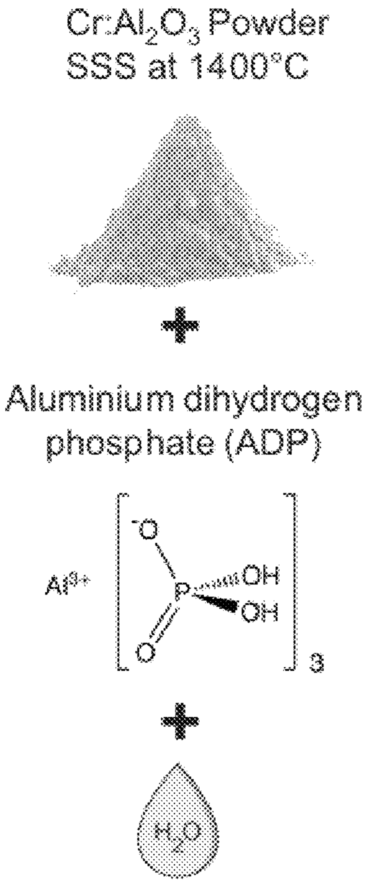
FIG. 5 provides example slurry ingredients, in accordance with an exemplary embodiment of the present invention.
Figure 6:
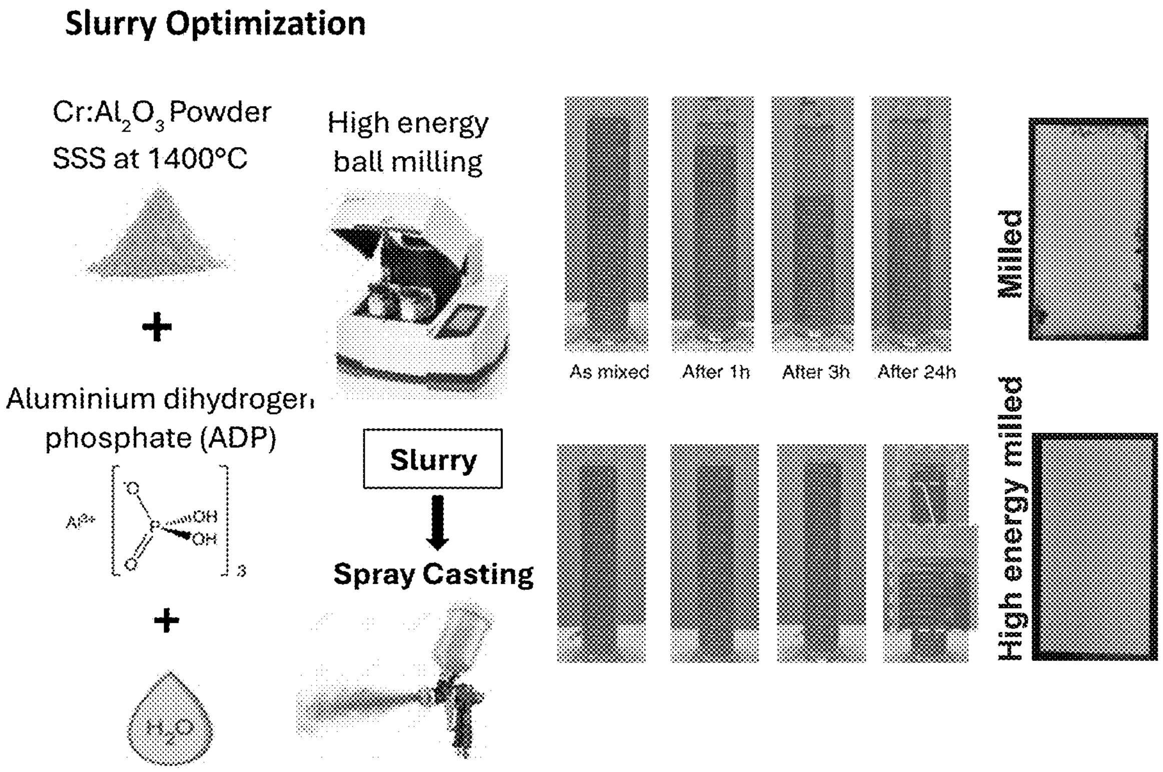
FIG. 6 provides an example workflow for a method for making a ceramic object, in accordance with an exemplary embodiment of the present invention.
Figure 7:
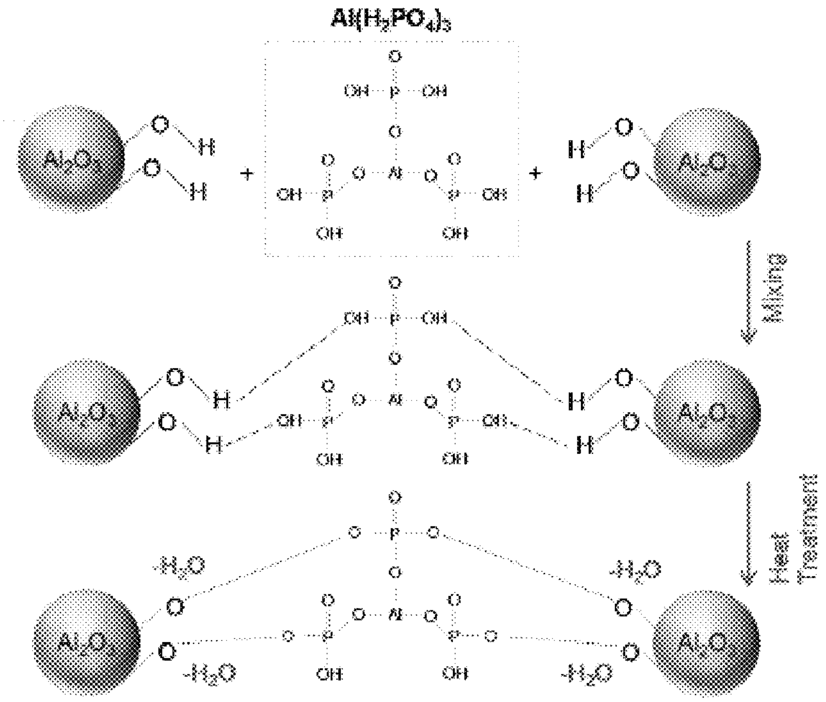
FIG. 7 provides an example ceramic formation reaction, in accordance with an exemplary embodiment of the present invention.

FIG. 3 shows a schematic workflow for an example high temperature ceramic sensor, in accordance with an exemplary embodiment of the present disclosure. A ceramic material in powder form can be slurried and sprayed, and then can undergo photonic curing. The resulting ceramic object can function as a temperature sensor. FIG. 4. provides images of some example thermochromic ceramic objects. FIG. 5 provides example slurry ingredients. As shown in FIG. 6, in an example workflow for a method for making a ceramic object, high energy milled powder results in a more uniform end-product. FIG. 7 provides an example ceramic formation reaction, from pre-mixing to mixing to heat treatment.

In any embodiment of the present disclosure, the slurry of the ceramic material and the binding material can be spray-cast on a surface and the layer can be sequentially exposed to flash lamp annealing according to a respective three-dimensional-object-patterned slice to create a three-dimensional object comprising slices formed from a cured slurry. The slurry can be added to a surface via any method for depositing a thin layer of ceramic suspensions. For example, in some embodiments the slurry is added to a surface via extrusion, blade casting, spray casting, spin casting, aerosolized delivery, or other related methods. In some embodiments, the thickness of the layer can range anywhere from 0.5 microns to 1 cm. For example, in some embodiments the thickness of the layer can range from 0.5 microns to 1 micron, 0.5 microns to 10 microns, 0.5 microns to 100 microns, 0.5 microns to 500 microns, 0.5 microns to 1 mm, 0.5 microns to 5 mm, 0.5 microns to 1 cm, 1 micron to 10 microns, 1 micron to 100 microns, 1 micron to 500 microns, 1 microns to 1 mm, 1 micron to 5 mm, 1 microns to 1 cm, 10 microns to 100 microns, 10 microns to 500 microns, 10 microns to 1 mm, 10 microns to 5 mm, 10 microns to 1 cm, 100 microns to 500 microns, 100 microns to 1 mm, 100 microns to 5 mm, 100 microns to 1 cm, 500 microns to 1 mm, 500 micron to 5 mm, 500 microns to 1 cm, 1 mm to 5 mm, or 1 mm to 1 cm.

In any embodiments of the present disclosure, flash lamp annealing the ceramic material and the binding material can comprise applying approximately 1 to 500 pulses of light energy at an energy density of approximately 0.5 to 50 J/cm$^2$. For example, in some embodiments, flash lamp annealing the ceramic material and the binding material can comprise applying approximately 1 to 10, 1 to 20, 1 to 30, 1 to 40, 1 to 50, 1 to 100, 1 to 200, 1 to 300, 1 to 400, 10 to 20, 10 to 30, 10 to 40, 10 to 50, 10 to 100, 10 to 200, 10 to 300, 10 to 400, 50 to 100, 50 to 200, 50 to 300, 50 to 400, 50 to 500, 100 to 200, 100 to 300, 100 to 400, 100 to 500, 200 to 300, 200 to 400, 200 to 500, 300 to 400, 300 to 500, or 400 to 500 pulses of light energy at an energy density of 0.5 to 10 J/cm$^2$, 0.5 to 20 J/cm$^2$, 0.5 to 30 J/cm$^2$, 0.5 to 40 J/cm$^2$, 1 to 10 J/cm$^2$, 1 to 20 J/cm$^2$, 1 to 30 J/cm$^2$, 1 to 40 J/cm$^2$, 1 to 50 J/cm$^2$, 5 to 10 J/cm$^2$, 5 to 20 J/cm$^2$, 5 to 30 J/cm$^2$, 5 to 40 J/cm$^2$, 5 to 50 J/cm$^2$, 10 to 20 J/cm$^2$, 10 to 30 J/cm$^2$, 10 to 40 J/cm$^2$, 10 to 50 J/cm$^2$, 20 to 30 J/cm$^2$, 20 to 40 J/cm$^2$, 20 to 50 J/cm$^2$, 30 to 40 J/cm$^2$, 30 to 50 J/cm$^2$, or 40 to 50 J/cm$^2$.

Figure 8:
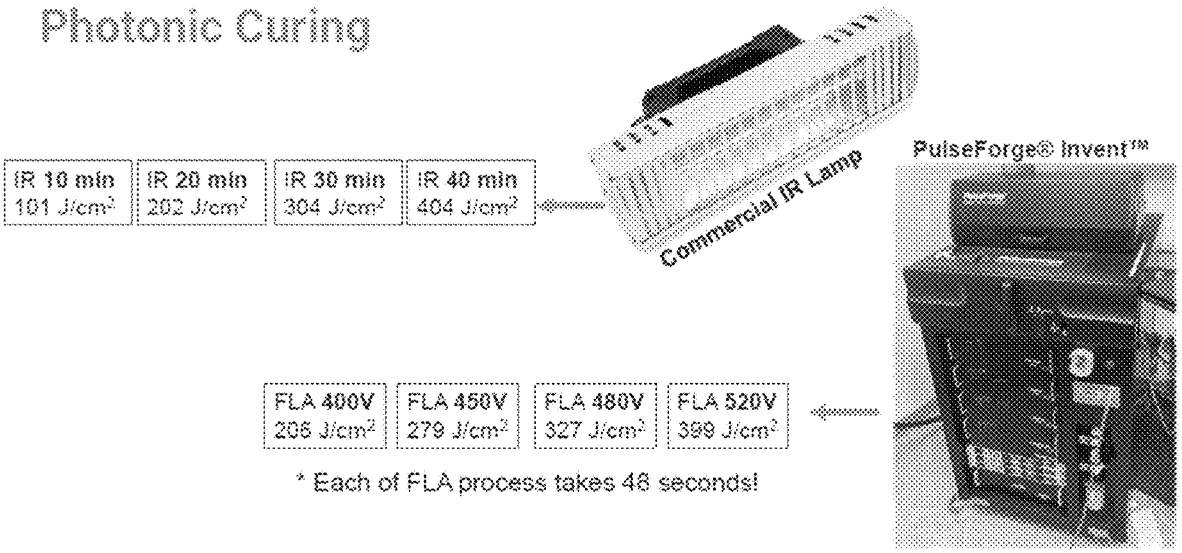
FIG. 8 provides comparison curing data between a commercial IR lamp and a lamp used for flash lamp annealing, in accordance with an exemplary embodiment of the present invention.
Figures 9A, 9B:
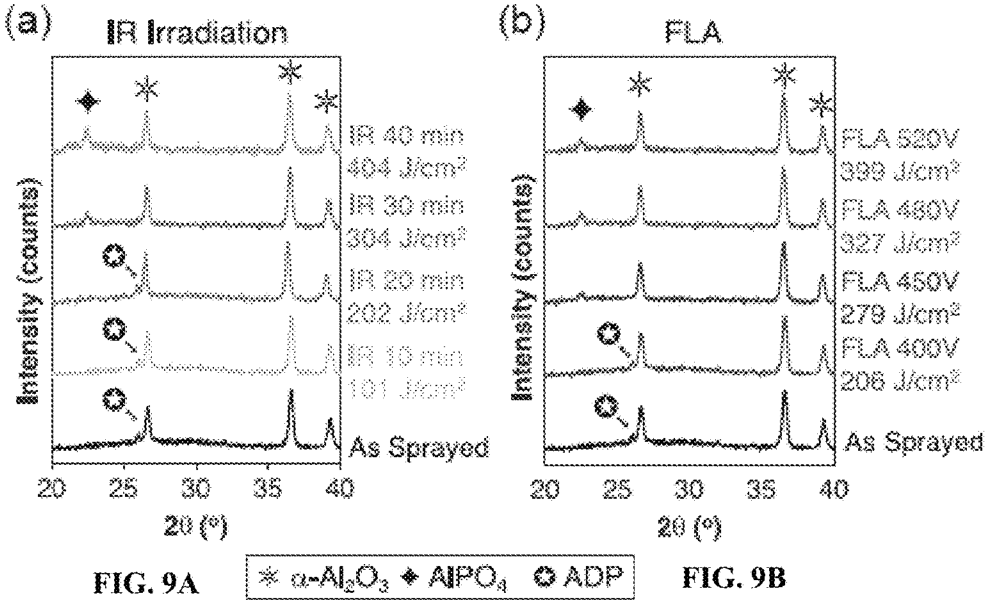
FIGS. 9A-9B provide XRD diffractograms for IR-irradiated (FIG. 9A), and FLA-processed (FIG. 9B) Cr:Al2O3-ADP layers. Miller indices of peaks at $2\theta$=22.6 (♦), 26.3 (✪), 26.7 (✻), 36.5 (✻), and 39.3 (✻) are 211, 101, 102, 104, and 110, respectively, in accordance with an exemplary embodiment of the present invention.

FIG. 8 provides comparison curing data between a commercial IR lamp and a lamp used for flash lamp annealing. The flash lamp annealing process is much faster and more energy efficient. FIGS. 9A-9B provide data relating to phosphate condensation for comparison between a commercial IR lamp and a lamp used for flash lamp annealing.

In any embodiments disclosed herein, flash lamp annealing the ceramic material and the binding material can further comprise a pre-heating step. In some embodiments, the pre-heating step removes physically adsorbed water prior to applying higher energy pulses of light energy to drive ceramization. The layer of slurry can be pre-heated with approximately 1 to 50 pulses of light energy at an energy density of approximately 0.5 to 5.0 J/cm$^2$. For example, in some embodiments, the layer of slurry can be pre-heated with approximately 1 to 10, 1 to 20, 1 to 30, 1 to 40, 5 to 20, 5 to 30, 5 to 40, 5 to 50, 10 to 20, 10 to 30, 10 to 40, 10 to 50, 20 to 30, 20 to 40, 20 to 50, 30 to 40, 30 to 50, or 40 to 50 pulses of light energy at an energy density of approximately 0.5 to 1 J/cm$^2$, 0.5 to 2 J/cm$^2$, 0.5 to 3 J/cm$^2$, 0.5 to 4 J/cm$^2$, 1 to 2 J/cm$^2$, 1 to 3 J/cm$^2$, 1 to 4 J/cm$^2$, 1 to 5 J/cm$^2$, 2 to 3 J/cm$^2$, 2 to 4 J/cm$^2$, 2 to 5 J/cm$^2$, 3 to 4 J/cm$^2$, 3 to 5 J/cm$^2$, or 4 to 5 J/cm$^2$.

FIG. 10 provides comparison images between ceramics formed from varying processes. FIG. 11A provides comparison images for differentially synthesized temperature sensors. As shown in FIG. 12, a thermochromic sensor made with the example method disclosed herein indicates a temperature change of approximately 575 degrees Celsius, from approximately 25 degrees Celsius to approximately 600 degrees Celsius. These heating and cooling cycles are reflected in the plots shown in FIG. 13.

In some embodiments, the ceramic material can comprise one or more metal oxides selected from the group consisting of alumina, silica, magnesium oxide, zinc oxide, chromium oxide, iron oxide, titanium oxide, calcium oxide, niobium oxide, hafnium oxide, yttrium oxide, zirconium oxide, barium oxide, strontium oxide, and mixtures thereof.

In some embodiments, the ceramic material can further comprise one or more additives configured to induce a material property in the ceramic object. Suitable additives include, without limitation, $Cr_2O_3$, $VO_2$, $TiO_2$, ZnO, iron oxide, ferrites, $CoFe_2O_4$, iron silicon alloys, and mixtures thereof. In some embodiments, the one or more additives can be magnetic materials, conductive materials, electrochromic materials, phase change materials, or combinations thereof. In some embodiments, the material property can comprise thermochromism. Suitable additives for inducing thermochromism include, without limitation, $Cr_2O_3$ and $VO_2$.

In some embodiments, the binding material can comprise a composition configured to create a chemically bonded ceramic (CBC). In such embodiments, the binding material can comprise one or more of aluminum dihydrogen phosphate (ADP), aluminum silicate, beryllium phosphate, calcium phosphate, iron phosphate, lanthanum phosphate, magnesium phosphate, sodium phosphate, potassium phosphate, yttrium phosphate, zinc phosphate, and zirconium phosphate. In any embodiment disclosed herein, chemically bonded ceramics can be formed by using flash lamp annealing to induce low temperature chemical reactions between the binding material and the ceramic material.

In some embodiments, the binding material can comprise a composition configured to create a porcelain ceramic. In such embodiments, the binding material can comprise one or more of kaolin (alumina silicate), feldspars, and talc (magnesium silicate). In some embodiments, a porcelain ceramic is created from silica, kaolin clay, and feldspar. In any embodiment disclosed herein, porcelain ceramics can be formed by using flash lamp annealing to induce vitreous formation pathways. The silica can be an aggregate of particles to provide strength. The kaolin can undergo a reaction at about 500° C. that causes it to dehydrate, creating aluminum on silicon oxide, which is amorphous (vitreous or glass). Then, upon heating to around 1000° C. the amorphous phase can convert to a crystalline phase (mullite), which has a needle like habit. The needles can be good for improving strength in ceramics. At around 1000° C. to 1200° C., the feldspar can melt to form a glassy phase that binds everything together in a dense ceramic phase.

Another exemplary embodiment of the present disclosure provides a system for manufacturing a ceramic product. The system comprises a ceramic material, a binding material, and a lamp for flash lamp annealing, wherein the lamp is configured to generate light to induce a chemical reaction between the ceramic material and the binding material to create the ceramic product. In any embodiment of the present disclosure, the lamp is configured to apply light at pulses and energy densities as described herein.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

EXAMPLES

The following Examples are presented to illustrate various aspects of the present disclosure, but are by no means intended to limit its scope.

As disclosed herein, an inorganic, high-temperature (~600° C.) thermochromic sensor was synthesized from a chemically bonded ceramic (CBC) composite. The ceramic composite is composed of thermochromic chromium-doped alumina powder blended with a low-reacting temperature (around 250° C.) phosphate binder, $Al(H_2PO_4)_3$, (ADP). Cr-doped alumina exhibits thermochromism at high temperatures, typically around 500-600° C. Previously, infrared (IR) irradiation has been used to successfully convert ADP to a ceramic aluminum phosphate ($AlPO_4$) ceramic phase that can bind ceramic components together. Herein, an ultra-high power (tens of kilowatts per square centimeter) flash lamp annealing (FLA) system is disclosed as an alternative photonic heating process to rapidly transform ADP to this ceramic. While IR lamps require 30 min to fully transform the ADP binder, FLA processes require less than 1 min and provide more dense microstructures, opening opportunities to additively manufacture ceramic components without the need for a post-processing heating step. Final ceramics exhibit reversible thermochromic behavior, transitioning from pink to dark gray as the temperature increases from 25° C. to 600° C. Here, the ability to use this technology to fabricate a temperature warning system for heated objects that are not yet emitting significant intensities of visible black-body radiation is demonstrated.

Example 1—Materials and Methods

Preparation of $Cr_2O_3$-Doped $Al_2O_3$ Thermochromic Slurries

Solid State Synthesis of $Cr_2O_3$-$Al_2O_3$Powders

Equal amounts of two different nano-sized a-$Al_2O_3$ powders (30 nm and 100 nm 99.5% purity, sourced from MSE Supplies) were mixed with 10 wt. % $Cr_2O_3$ powder in an analog tube roller. The solid-state synthesis of these components was carried out in an electric furnace at 1000° C., 1200° C. and 1400° C. to study the influence of temperature on a-$Al_2O_3$—$Cr_2O_3$ interaction. Pure Cr:$Al_2O_3$ pellets were uniaxially pressed into pellet form to study and optimize the thermochromic response.

Thermochromic Slurry Preparation

Slurries of thermochromic ceramic powder and ADP binder were prepared to make thermochromic composites that could be easily printed. The inorganic phosphate binder $Al(H_2PO_4)_3$ (ADP) is supplied in powder form (>95.0%, Sigma Aldrich), and a 35 wt. % aqueous solution was prepared by dissolving the ADP in deionized water for 12 hours with continuous stirring. ADP showed a significant affinity for humidity in the air, due to the high number of hydroxyl groups in its structure. When the powder of ADP was exposed to the ambient lab environment, the hydroxyl groups reacted with water to soften the ADP into a jelly form. The ADP converted into ceramic $AlPO_4$ was not hygroscopic. Thus, a strong relationship existed between the successful conversion of ADP to $AlPO_4$ and the amount of water mass uptake for this material. We subsequently used this relationship to understand the amount of ADP to $AlPO_4$ conversion.

A thermochromic ceramic slurry was prepared by mixing 60 g of the ADP solution with 15 g of Cr:$Al_2O_3$ powder (SSS at 1400° C.). The slurry was then milled in a high energy ball mill (RETSCH E-max) with speeds of 1200 $min^{-1}$ for 2 hours using stainless steel grinding jars and balls (with radius changing from 0.1 mm to 25 mm). The final molar ratio of ADP to $Al_2O_3$ was 1.3:1. A high-volume low-pressure air spray gun (Master AirBrush) was then used to spray-cast these slurries onto soda-lime glass slides and stainless-steel substrates. Spray casted layers were preserved in a drying chamber at 70° C. until further processing either by flash lamp annealing or infrared irradiation.

Thermochromic Sensor Design

To design a thermochromic high-temperature sensor, a mask (76×26×2 mm) with hollow “S A F E” letters was printed using the fused filament deposition method. First, a bare borosilicate microscope glass slide (76×26×2) was spray-coated with Cr:$Al_2O_3$ (SSS at 1000° C.)-ADP slurry and this layer were photonic cured using FLA. Then, the FDM-printed mask was placed on top of this layer and the hollow “S A F E” letters were filled with spray-casting using the Cr:$Al_2O_3$ (SSS at 1400° C.)-ADP slurry. This second layer was then also cured with FLA.

IR and FLA Processing

After preparing slurries and spray-casting on substrates, each deposited layer was initially dried in an oven at 60° C. for one hour to set the same hydration level and then photonically cured with either an infrared lamp (Solary 1600 W IR lamp) or a flash lamp annealing system (PulseForge®, Invent™).

IR irradiation was performed for 10, 20, 30, or 40 minutes at a distance of 5 cm to investigate the impact of processing time on the condensation-polymerization of the ADP binder. An optical power meter (Newport 1830-C) was used to measure the actual power delivered by the IR lamp onto the samples. The energy density transferred to the sample was calculated using the formula:

$$| \text{Energy} = \frac{\text{Power(Watts)} \times \text{Time(Seconds)}}{3.14} [J/\text{cm}^2]$$

where the power is the reading from the optical power meter in Watts for a 5 cm distance, time is the processing time in seconds, and 3.14 $cm^2$ is the surface area of the probe. The calculated energy densities for processing times of 10, 20, 30, and 40 minutes were 101, 203, 304, and 405 $J/cm^2$, respectively.

Other $Cr:Al_2O_3$-ADP layers were photonically cured with a FLA system (PulseForge®, Invent™). The distance between xenon lamp and sample surface was set to 11 mm. The photonic pulse sequence was freely adjusted. It was found that an initial sequence of low-energy pulses (10 flashes with 100 V or 1.1 $J/cm^2$ of lamp power for a total energy of at 11 $J/cm^2$) was important to first remove physically absorbed water prior to driving ceramization. This "drying step" was followed by higher energy pulses at a range of lamp voltages varying from 400 V to 520 V, each with 30 repetitions, providing energy densities of 207, 279, 327, and 399 $J/cm^2$ respectively, paralleling those provided by the IR lamp. Since energy delivery was varied by lamp voltage, the duration of each FLA process was able to be kept constant at 48 seconds.

Chemical and Physical Characterization

Crystallographic properties of powders and cured layers, were studied with an ARL Equinox 100 X-Ray diffractometer (Cu Ka=1.5406 Å) with an angle of incidence set to 8°. Water sorption was also used as a measure of the fractional conversion of ADP to $AlPO_4$. For these tests, samples were weighed just after IR or FLA, and 24 hours after exposure to room atmosphere with 54% humidity. The difference between two measurements was considered as the capacity of water mass uptake, indicative of the amount of unreacted, hygroscopic ADP remaining in the material.

A digital microscope (Leica DVM6) was used to take images of top surface and cross section of $Cr:Al_2O_3$-ADP layers before and after IR and FLA curing. Scanning electron microscopy (SEM) was performed on a benchtop SEM (Phenom ProX G5) using 10 and 15 kV in image mode. Then specimens were affixed to aluminum stubs using conductive carbon tape and subsequently coated with a 1.5-5 nm layer of gold using sputtering method prior to imaging.

An Avantes fiber optic UV/Vis spectrometer (Avaspec-ULS2048CL-EVO) with an integrating sphere attachment for diffuse reflectance analysis was used to measure the color of the thermochromic ceramics. Pellets were heated to 200° C., 400° C., and 600° C. and their thermochromic color change was tracked visually and with the Avantes CIE L*a*b colorimetry software. The CIELAB color space, as defined by the International Commission on Illumination (CIE), provided a standardized way to numerically quantify the color of an object. L*, a*, and b* represent the CIE Lab* color parameters (Hill et al., "Comparative Analysis of the Quantization of Color Spaces on the Basis of the CIELAB Color-Difference Formula," *ACM Trans. Graph.* 16(2):109-154 (1997)). Pellets were then cooled to room temperature to study the reversibility of the color change.

Example 2—Results and Discussion

Optimization of Thermochromic Cr-Doped $Al_2O_3$Powders for Spray-Cast Ceramic Composites To optimize for color and desired thermochromic response, $Cr:Al_2O_3$ powders were prepared at varying annealing temperatures (FIG. 11A). As-mixed powders are visually green prior to SSS. Upon heating, the ceramics transform from green to gray-green (1000° C.), to gray (1200° C.) and finally to pink (1400° C.). The chemical dissolution of $Cr_2O_3$ into $Al_2O_3$ is tracked with XRD (FIG. 11B). Both the $Cr_2O_3$ and $Al_2O_3$ phases are clearly present in the as-mixed powders and at 1000° C.; thus, the gray-green color is likely indicative of residual $Cr_2O_3$, powder mixed with some $Cr:Al_2O_3$ at this process temperature. Subsequent annealing to 1200° C. and 1400° C. results in full dissolution of the $Cr_2O_3$ into the alumina phase. FIG. 11A illustrates the thermochromic response of powders SSS at 1000° C., 1200° C. and 1400° C. upon heating to 200° C., 400° C., and 600° C. The 1400° C. SSS powders show the most significant color change when heated from room temperature to 600° C., transforming from pink (L=75.73, a*=9.41, b*=−3.08) to dark gray (L=63.28, a*=−1.45, b*=−4.56). Interestingly, powders prepared at lower temperatures show minimal change from their initial gray appearance; this non-response is also used later as part of a temperature sensitive device design. These results are consistent with prior studies that used similar $Cr:Al_2O_3$ weight ratios (Lewis et al., "Cr3+ Doped Al2O3 Nanoparticles: Effect of Cr3+ Content in Intensifying Red Emission," *Current Applied Physics* 32:71-77 (2021); Nguyen et al., "Synthesis and Thermochromic Properties of Cr-Doped Al2O3 for a Reversible Thermochromic Sensor," *Materials* 10(5):476 (2017)).

The absorbance and reflectance graphs of $Al_2O_3$, $Cr_2O_3$, $Cr_2O_3$+$Al_2O_3$ physical mixture, $Cr:Al_2O_3$ SSS at 1400° C. and $Cr:Al_2O_3$ SSS at 1000° C. between 400 nm and 800 nm are shown in FIGS. 14A-14B. Pure alumina has the lowest absorbance due to its wide bandgap (which is typically around 8-9 eV). The absorbance of $Cr_2O_3$+$Al_2O_3$ physical mixture is somewhere in between pure $Al_2O_3$ and $Cr_2O_3$, as an expected result from their physical mixture. For solid state synthesized samples, the one cured at 1000° C. has the highest absorbance. Between 600 and 750 nm, it shows similar absorbance as pure $Cr_2O_3$, suggesting some residual, unreacted $Cr_2O_3$ powder may still remain (also observed in the XRD patterns). For SSS at 1400° C., a characteristic absorbance peak for Cr-doped $Al_2O_3$ emerges at 565 nm which is associated with the d-d electronic transitions of $Cr^{3+4}A_{2g}\rightarrow{}^4T_{2g}$. This band corresponds to electronic transitions of chromium ions ($Cr^{3+}$) in an octahedral environment. Increasing annealing temperature decreases Cr—O distances, substitutes larger $Cr^{3+}$ ions into the alumina lattice, thus, it strengthens the ligand field. This leads to absorption bands shifting to lower wavelengths, causing the synthesized samples to change color first from green to gray and finally to pink.

While SSS at 1400° C. was successful in achieving a high-temperature thermochromic response, it was found that the powders became significantly more hydrophobic than their pre-heated counterparts. This hydrophobicity leads to rapid sedimentation in aqueous dispersions, preventing uniform and consistent spray casting. Several approaches were evaluated to improve dispersement of the powders, but high-energy milling (nano-milling) in an aqueous medium was found to be the simplest and most effective solution. FIGS. 15A-15D summarize this challenge and its solution. FIG. 15A demonstrates the sedimentation rates of non-milled and nano-milled SSS 10 wt. % $Cr:Al_2O_3$-ADP slurries. Sedimentation is observed for the non-milled slurry starting from the first hour. The sedimentation increases over time with 65 vol % segregated liquid phase observed within 24 hours of settling. After 72 hours, non-milled slurries reach complete sedimentation. In contrast, nano-milled slurries do not exhibit any visual phase separation until 24 hours, at which point only 8 vol % liquid phase is visible. FIG. 15B plots these sedimentation rates.

Nano-milling of the powders in aqueous medium to reduce the sedimentation rate is found to be essential to allow for delivery approaches (like spraying) that are commensurate with additive manufacturing. FIG. 15C provides photographic comparisons of layers sprayed using non-milled and nano-milled powders. Slurries with non-milled powders are non-uniform and show poor wetting on glass substrates. Slurries with nano-milled powders give uniform coverage with layer thicknesses of 100-125 mm (FIG. 15D).

Nano-milling appears to break apart agglomerates (FIG. 15D), reducing their size and their sedimentation rate. When particles interact in concentrated suspensions, their sedimentation rates are determined by hydrodynamic interactions. The friction force ($F^{ext}$) for a Brownian particle is equal to $6\pi\eta_o\alpha v_s$, with $\eta_o$ the solvent's viscosity, $\alpha$ is the radium of a presumed sphere particle, and $v_s$ is the sedimentation velocity. This equation can be rewritten as follows $$v_s = \frac{1}{6\pi\eta_o\alpha}F^{ext} \quad \text{(Eq. 1)}$$

During sedimentation test, both samples were kept stable without any external forces such as shaking or centrifugation, thus the only force that applies to particles is the gravity and buoyancy. Thus, the external force $F^{ext}$ can be written as $$F^{ext} = g\frac{4\pi}{3}\alpha^3(\rho_p - \rho_f) \quad \text{(Eq. 2)}$$

where $\rho_p$ and $\rho_f$ are the density of particles and the fluid respectively and g is the gravity as of 9.8 $ms^{-2}$. Using this in Equation (1), we can express the sedimentation velocity as $$v_s = g\frac{2\alpha^2}{9\eta_o}(\rho_p - \rho_f) \quad \text{(Eq. 3)}$$

Here, it is clear that the sedimentation velocity changes with the radius of particles as $\alpha^2$. Larger particles of identical density, sediment faster than smaller particles. This hypothesis is valid for particles that do not interact with each other nor with the solvent. At early times, this is likely valid. In fact, comparing the initial slopes in FIG. 15B (which is the sedimentation velocity), a difference of about 270× between the milled (slope=0.12) to the non-milled (slope=32.5) powders was found. This difference is comparable in order of magnitude to the ratio of the squared particle radii imaged in FIG. 15D: $(65\ mm)^2/(5\ mm)^2=169\times$, suggesting this initial slope is indicative of gravity-driven particle sedimentation. Interestingly, at longer times, both systems show a change in sedimentation rate that is almost the same. Inventors suspect that this new velocity results from particle-particle interactions or ADP binding in the slurry while the exact mechanism is not clear, this case is also not relevant for this particular use application.

Comparing IR and FLA Treatments for ADP to $AlPO_4$ Conversion

Successful fabrication of CBPC ceramic composites requires conversion of the ADP precursor to the $AlPO_4$ ceramic phase. Here, rapid conversion via remote energy delivery is desired to support potential routes to additively manufacture ceramic composite components. Previously, inventors demonstrated that direct conversion is possible using an IR lamp that can deliver ~0.2 $W/cm^2$ of photonic power (Somers et al., "Infrared Irradiation to Drive Phosphate Condensation as a Route to Direct Additive Manufacturing of Oxide Ceramics," *J Am Ceram Soc.* 107(1):36-46 (2024)), but this method can take several to tens of minutes to fully undergo ceramization. Herein, this IR irradiation is compared to a high-power flash lamp capable of delivering $kW/cm^2$ of photonic power. Components processed with both IR irradiation and FLA processing were mechanically robust and had sufficient strength to be handled, moved, and to perform characterization.

FIGS. 9A-9B presents XRD data for a series of spray-cast $Cr{:}Al_2O_3$-ADP layers photonically treated with an IR lamp (FIG. 9*a*) and with the FLA (FIG. 9B). These diffractograms confirm that both methods can convert ADP to $AlPO_4$. As-sprayed $Cr{:}Al_2O_3$-ADP diffractograms match with the diffraction patterns for $Al(H_2PO_4)_3$ (ADP) and trigonal $\alpha$-$Al_2O_3$ (reference pattern ICSD 52648), as indicated with ✪ and ✳, respectively. The $\alpha$-$Al_2O_3$ phase remains consistent throughout all heating processes. The ADP phase, which has its strongest diffraction signal at 24°, converts to the $AlPO_4$ phase labeled with a ✦ as the amount of energy delivered increases.

For IR heating, the diffraction peak for ADP disappears between 304 and 404 $J/cm^2$ of energy delivery (or 20 to 30 min of irradiation). For FLA heating, the ADP diffraction peak disappears between 279 and 327 $J/cm^2$ (both only 48 s of process time). Interestingly, in both cases, the $AlPO_4$ diffraction peak emerges above ~300 $J/cm^2$ of energy delivered, and the diffraction intensity increases with increasing delivered energy, indicative of increasing crystallinity or amount of the phase. Similar structural changes consistent with the conversion of ADP to $AlPO_4$ in infrared spectroscopy were detected (see supporting information). Inventors note that FLA heating of this slurry is assisted by the fact that the ceramic powder is thermochromic and absorbs light at optical wavelengths, allowing for heating of the material. For cases where slurry compositions create a white appearance (mostly reflective to optical wavelengths), FLA heating has been observed to be much less efficient.

Figure 16A:
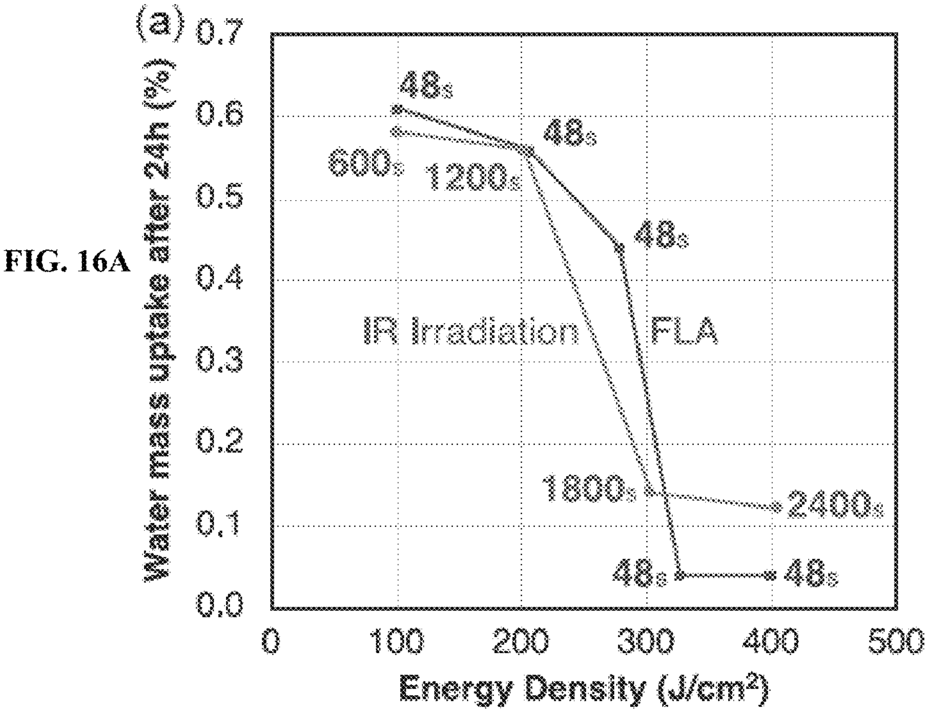
FIG. 16A provides water mass uptake of $Cr:Al_2O_3$-ADP layers that are processed with FLA at 350 V, 400 V, 450 V, 480 V and 520 V of lamp power, and IR processed for 10, 20, 30, and 40 minutes, in accordance with an exemplary embodiment of the present invention.
Figure 16B:
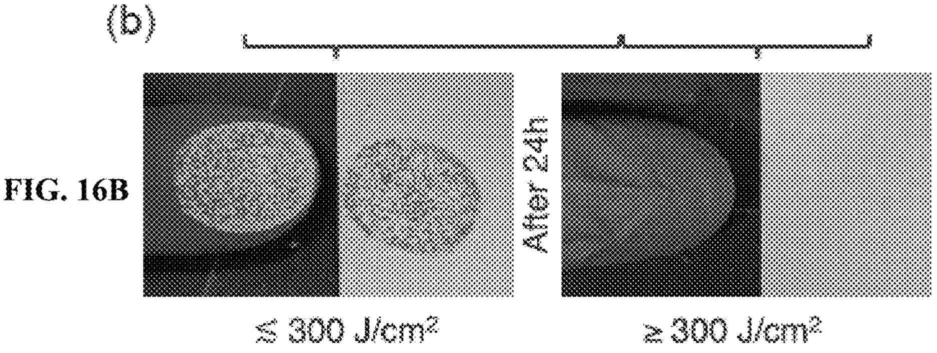
FIG. 16B provides photographs of a touch test to show how hydration degrades the material after 24 h of ambient exposure, comparing materials processed at <300 $J/cm^2$ (left, degraded) to those process at >300 $J/cm^2$ (right, not degraded), in accordance with an exemplary embodiment of the present invention.

While diffraction and spectroscopy provide direct evidence of the structural and chemical transformations occurring, operationally it is important to react "sufficiently" to avoid ADP's hygroscopic sorption of humidity from the atmosphere. If not "sufficiently" reacted, then composites will sorb water and lose mechanical integrity. ADP shows a significant affinity for water, due to its high number of hydroxyl groups. When the powder of ADP is exposed to an ambient lab environment, the hydroxyl groups react with water to soften the ADP into a jelly form. Ceramized $AlPO_4$ is not hygroscopic. Thus, a strong relationship exists between the successful conversion of ADP to $AlPO_4$ and the amount of water mass uptake for this material. Thus, quantitative measurements of the gravimetric water uptake in the final CBPC ceramic composite can provide additional characterization of the fractional transformation of ADP to $AlPO_4$ and a practical assessment of when the composite is fully stable. To quantify this behavior, the mass uptake of the composites when left for 24 h in an ambient lab environment of 54% relative humidity was measured. The measured mass uptake is presumably water sorption. FIG. 16A plots this water mass uptake for composites prepared at similar IR exposure times and FLA energy densities presented in the XRD data of FIG. 16A. As expected, with increased energy delivery, composites sorb less water. Interestingly, for both irradiation methods, abrupt drops in water sorption are observed between 200 and 300 $J/cm^2$, demonstrating some consistency in the energy necessary for ceramic conversion in this system irrespective of the photonic energy delivery method. Two other key observations are (1) that at "full conversion" the FLA system reaches an overall lower water mass uptake than the IR heated system and (2) the time to reach this "full conversion" is almost two orders of magnitude shorter for the FLA process than the IR process (48 s vs ~2000 s). The speed of this FLA process is particularly notable as it suggests a pathway to practical single-step additive manufacturing.

Figure 17A:
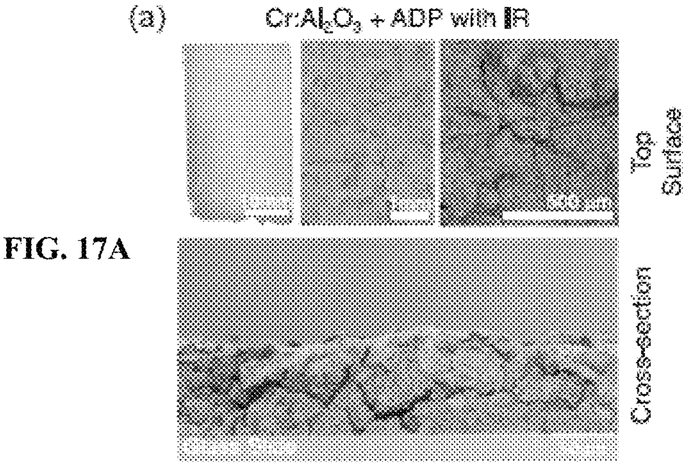
FIGS. 17A-17C provide top surface (photograph, optical image, and SEM) and cross-sectional SEM images of $Cr:Al_2O_3$-ADP layers processed with IR irradiation for 30 minutes (FIG. 17A), FLA using only high energy pulses (30×10.3 $J/cm^2$ pulses) (FIG. 17B), and FLA processed with a preheating step (10×1.1 $J/cm^2$ pulses) followed by 30×10 $J/cm^2$ pulses (FIG. 17C), in accordance with an exemplary embodiment of the present invention.
Figure 17B:
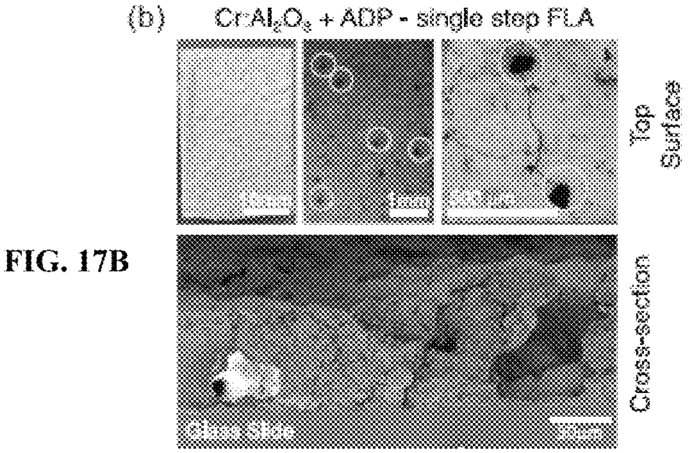
Figure 17C:
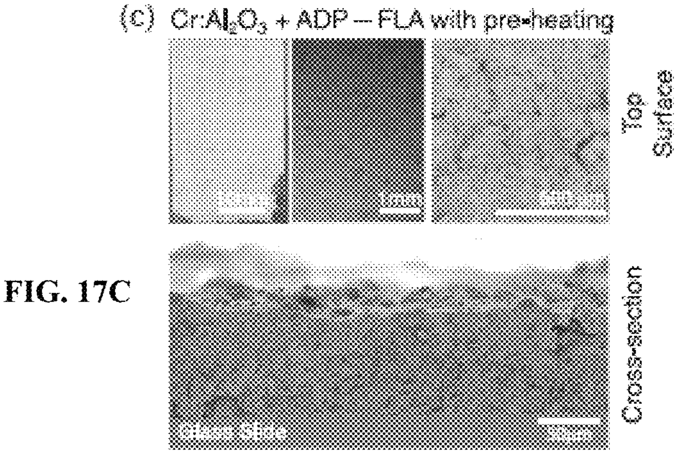
Figure 18:
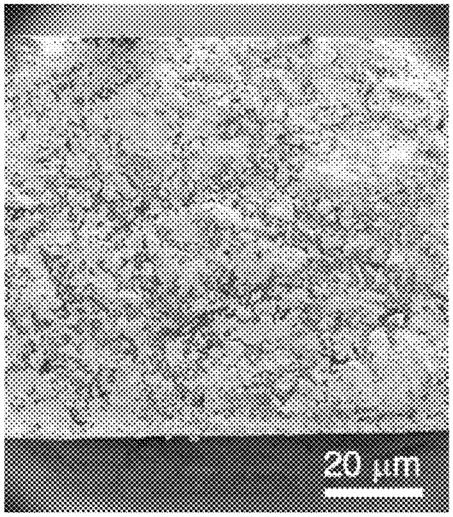
FIG. 18 provides a cross-section SEM image of as-sprayed 10 wt. % $Cr:Al_2O_3$-ADP (SSS at 1400° C.) layer after drying at 120° C. for an hour, in accordance with an exemplary embodiment of the present invention.

Effect of IR and FLA Processing on the Microstructure of $Cr:Al_2O_3$-ADP Layers FIGS. 17A-17C show top surface and cross-sectional optical and SEM micrographs of $Cr:Al_2O_3$-ADP layers processed with IR irradiation (FIG. 17A) and FLA (FIGS. 17B and 17C). The top surface of IR processed layers are reasonably homogenous but consist of cracks as shown in FIG. 17A. These cracks most likely occur due to volume shrinkage during dehydration and ceramization. As sprayed layers are about 100-125 mm thick but consolidate to as thin as 45-55 μm upon irradiation. Cross-sectional images reveal significant cracking and discontinuities in the bulk of the IR heated layers as well. FIG. 17B shows $Cr:Al_2O_3$-ADP layers that are processed with FLA, using a sequence of 30 pulses of 10.3 $J/cm^2$ for a total delivery of approximately 309 $J/cm^2$. This direct energy deposition heats up the sample rapidly and causes holes in the structure (marked with yellow circles in FIG. 17B), most likely due to rapid evaporation of physically bound water. These outlet holes are continuous through the entire layer with diameters changing from 20 mm to 80 mm. FIG. 17C shows $Cr:Al_2O_3$-ADP layers that are processed with a pre-heating step (10×1.1 $J/cm^2$ pulses) to evaporate any physical water trapped in the layers. These layers are then subsequently processed with higher energy FLA pulses (total energy of 300 $J/cm^2$), identical to those used in FIG. 17B. Both top and cross-sectional microstructures show good homogeneity and consolidation with no indications of major defects nor cracking. The microstructure of as-sprayed layers is dense without any porosity and consists of two phases (dark part is ADP and bright part is alumina) as shown in FIG. 18. When compared to previously mentioned microstructures obtained using IR and FLA methods, the FLA with preheating has the success of preserving the dense microstructure of as-sprayed layers with its controllable heat transfer and water evaporation. This comparison shows the importance of parameter and strategy optimization during additive manufacturing approaches.

Demonstration of an Additively Manufactured Thermochromic Sensor

Figure 19A:
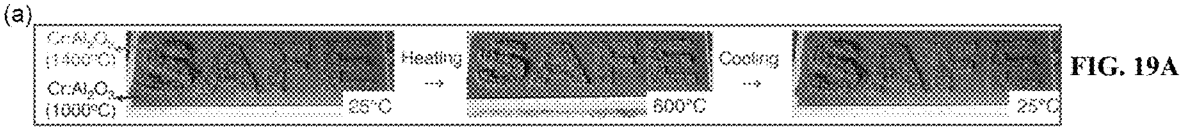
FIG. 19A provides (a) Glass slides prepared with letters of 10 wt. % $Cr:Al_2O_3$-ADP (SSS at 1400° C.) and surrounding media of 10 wt. % $Cr:Al_2O_3$-ADP (SSS at 1000° C.), in accordance with an exemplary embodiment of the present invention. Color change of letters at 600° C. makes them disappear within the background, warning users that it is no longer safe to touch.

To demonstrate feasibility of this approach for additive manufacturing, a patterned thermochromic CBPC composite layer ($Cr:Al_2O_3$ SSS at 1400° C.) has been spray-cast onto a non-thermochromic layer ($Cr:Al_2O_3$ SSS at 1000° C.). Using the color analysis from FIG. 11A, compositions were chosen such that the layers will have different colors at room temperature but nearly the same color at elevated temperatures (≥600° C.). FIG. 19A shows the results of this demonstration. Here, the word "SAFE" is printed in the thermochromic composite material to indicate the component is safe to touch. At room temperature, "SAFE" is highlighted in pink letters (L*=76.28, a*=24.45, b*=−4.56) on a gray background (L*=63.73, a*=−0.41, b*=−0.73), which allows for easy visual identification of the message. When heated to 600° C., the pink letters turn dark gray (L*=75.54, a*=24.31, b*=−4.38), making them visually "disappear" into the background. As the color separation is harder to distinguish, the system indicates it is no longer safe to touch due to its high temperature. This embedding method can also be employed to monitor the surface temperature of engineering equipment as a thermal sensor, particularly in cases where maintaining a temperature around 600° C. is crucial for efficient functioning and the temperature may not yet be visible due to black-body emission. Conceivably, other compositions could be synthesized with varying thermochromic temperatures to provide a range of temperature indicators in a single device.

Figure 19B:
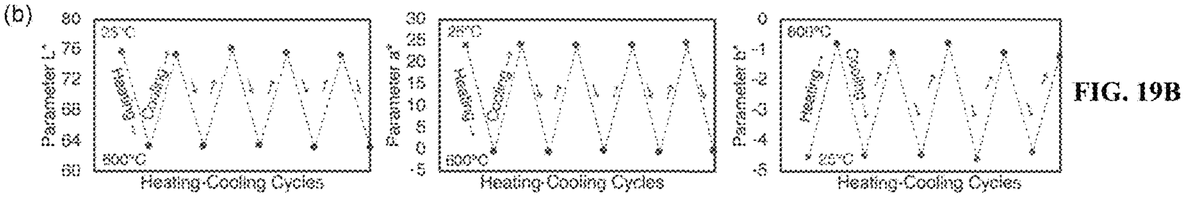
FIG. 19B provides L*, a*, and b* color values of letters during five cycles of heating and cooling between 25° C. and 600° C., in accordance with an exemplary embodiment of the present invention.

Importantly, this color change is reversible, and when the coatings cool back down to room temperature, the thermochromic layer returns to its pink color (right most image in FIG. 19A). To quantify this reversibility, FIG. 19B plots the L*, a*, and b* color values measured from the "SAFE" letters upon cycling between 600° C. and 25° C. over five cycles. Parameter L* changes by 18%, while parameters a* and b* changes by 25% and 7% respectively between 25° C. and 600° C. and less than 1% variation at a given temperature. Usually, it is expected that pink has CIELAB color properties around L*=60-80, a*=20-30, b*=0-5, and gray L*=50, a*=0, b*=−1 (Hill et al., "Comparative Analysis of the Quantization of Color Spaces on the Basis of the CIELAB Color-Difference Formula," *ACM Trans. Graph.* 16(2):109-154(1997)). The most significant change is in the a* parameter, which indicates the redness, consistent with the color change from pink to gray. Importantly, upon cycling, these color parameters generally return to similar values, indicating good reversibility of this thermochromic device.

CONCLUSION

This study shows the feasibility of processing chemically bonded phosphate ceramics with reversible thermochromic properties using photonic annealing methods in a process flow consistent with additive manufacturing. Phase analysis confirms that the remote photonic energy can transform the ADP binder into an $AlPO_4$ ceramic phase that binds the thermochromic powders together. Interestingly, the quantity of energy needed to achieve "full conversion" of ADP to $AlPO_4$ is approximately the same for both IR irradiation and flash lamp annealing, about 300 $J/cm^2$. However, FLA can accomplish this energy delivery in nearly two orders of magnitude shorter time (<1 min), making it even more amenable for rapid prototyping. By understanding the thermochromic color changes of $Cr:Al_2O_3$ under varying SSS conditions, a simple, patterned thermochromic device was manufactured to demonstrate the potential for this technology. Future work will need to optimize similar slurries for integration with higher resolution printing methods like inkjet printing and aerosol jet printing. Additionally, stacking of multiple layers and understanding their interaction, both internally and in conjunction with the flash lamp annealing method will bring a new approach to rapid additive manufacturing.

What is claimed is:

1. A method comprising:

flash lamp annealing a ceramic material and a binding material to induce a chemical reaction between the ceramic material and the binding material;

wherein the flash lamp annealing comprises at least one of:

applying light energy at pulses of between approximately 10 microseconds and 10 milliseconds;

applying light energy at an energy density of approximately 1 to 1000 J/cm$^2$;

or applying light energy at a power of approximately 1 to 50 kW/cm$^2$.

2. The method of claim 1 further comprising:

providing the ceramic material; and providing the binding material;

wherein the providing comprises creating a slurry comprising the ceramic material and the binding material.

3. The method of claim 2, wherein the providing further comprises:

providing the slurry on a surface for exposure to flash lamp annealing.

4. The method of claim 2, wherein creating the slurry comprises:

milling the ceramic material and the binding material; and adding a solvent.

5. The method of claim 1 further comprising:

creating a slurry comprising the ceramic material and the binding material;

providing the slurry on a surface for exposure to flash lamp annealing; and exposing a layer of the slurry on the surface to the flash lamp annealing according to a respective three-dimensional-object-patterned slice to create a three-dimensional object comprising slices formed from a cured slurry.

6. A method comprising:

creating a slurry comprising a ceramic material and a binding material;

providing the slurry on a surface for exposure to flash lamp annealing to induce a chemical reaction between the ceramic material and the binding material; and exposing a layer of the slurry on the surface to the flash lamp annealing according to a respective three-dimensional-object-patterned slice to create a three-dimensional object comprising slices formed from a cured slurry;

wherein the flash lamp annealing comprises:

applying approximately 1 to 500 pulses of light energy at an energy density of approximately 0.5 to 50 J/cm$^2$.

7. The method of claim 6, wherein the flash lamp annealing further comprises:

prior to the applying, pre-heating the layer of slurry with approximately 1 to 50 pulses of light energy at an energy density of approximately 0.5 to 5.0 J/cm$^2$.

8. The method of claim 1, wherein the ceramic material comprises one or more metal oxides selected from a group consisting of alumina, silica, magnesium oxide, zinc oxide, chromium oxide, iron oxide, titanium oxide, calcium oxide, niobium oxide, hafnium oxide, yttrium oxide, zirconium oxide, barium oxide, strontium oxide, and mixtures thereof.

9. The method of claim 8, wherein the ceramic material further comprises an additive configured to induce a material property in the ceramic object.

10. The method of claim 9, wherein the additive comprises an optically active dopant selected from a group consisting of $Cr_2O_3$, $VO_2$, $TiO_2$, ZnO, iron oxide, one or more organic dyes, and carbon (graphite).

11. The method of claim 1, wherein the binding material comprises a composition configured to create a chemically bonded ceramic (CBC).

12. The method of claim 1, wherein the binding material comprises a composition configured to create a porcelain ceramic.

13. The method of claim 1, wherein the binding material comprises an inorganic binder selected from a group consisting of aluminum dihydrogen phosphate (ADP), aluminum silicate, beryllium phosphate, calcium phosphate, iron phosphate, lanthanum phosphate, magnesium phosphate, sodium phosphate, potassium phosphate, yttrium phosphate, zinc phosphate, zirconium phosphate, alumina silicate, feldspars, magnesium silicate and combinations thereof.

14. A method comprising:

flash lamp annealing a ceramic material and a binding material to induce a chemical reaction between the ceramic material and the binding material;

wherein the flash lamp annealing comprises:

applying light energy at pulses of between approximately 10 microseconds and 10 milliseconds;

applying the light energy at an energy density of approximately 1 to 1000 J/cm$^2$; and applying the light energy at a power of approximately 1 to 50 kW/cm$^2$.

15. The method of claim 14 further comprising:

creating a slurry comprising the ceramic material and the binding material;

providing the slurry on a surface for exposure to flash lamp annealing;

pre-heating a layer of the slurry with approximately 1 to 50 pulses of light energy at an energy density of approximately 0.5 to 5.0 J/cm$^2$; and exposing the layer of the slurry on the surface to the flash lamp annealing according to a respective three-dimensional-object-patterned slice to create a three-dimensional object comprising slices formed from a cured slurry.

* * * * *